United States Patent
Buckler et al.

(10) Patent No.: US 9,294,263 B2
(45) Date of Patent: Mar. 22, 2016

(54) METHODS AND SYSTEMS OF SYNCHRONIZER SELECTION

(71) Applicant: Advanced Micro Devices, Inc., Sunnyvale, CA (US)

(72) Inventors: Mark Buckler, Acton, MA (US); Wayne P. Burleson, Shutesbury, MA (US); Srilatha Manne, Portland, OR (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 121 days.

(21) Appl. No.: 14/146,654

(22) Filed: Jan. 2, 2014

(65) Prior Publication Data

US 2015/0188649 A1    Jul. 2, 2015

(51) Int. Cl.
*H04J 3/06* (2006.01)
*H04L 7/02* (2006.01)
*G06F 1/12* (2006.01)
*H04W 56/00* (2009.01)
*H04L 7/033* (2006.01)

(52) U.S. Cl.
CPC .. *H04L 7/02* (2013.01); *G06F 1/12* (2013.01); *H04J 3/0602* (2013.01); *H04J 3/0632* (2013.01); *H04J 3/0638* (2013.01); *H04J 3/0685* (2013.01); *H04L 7/0331* (2013.01); *H04W 56/001* (2013.01)

(58) Field of Classification Search
CPC ..... H04J 3/0602; H04J 3/0638; H04J 3/0685; H04J 3/0632; H04W 56/001
See application file for complete search history.

(56) References Cited

U.S. PATENT DOCUMENTS

| 6,151,689 | A  | * | 11/2000 | Garcia | G06F 11/1482 |
| | | | | | 714/18 |
| 6,864,722 | B2 | | 3/2005 | Adkisson | |
| 7,324,546 | B1 | * | 1/2008 | Rowett | H04L 49/102 |
| | | | | | 370/458 |
| 7,715,467 | B1 | * | 5/2010 | Burney | H03M 9/00 |
| | | | | | 375/219 |
| 8,401,092 | B1 | * | 3/2013 | Liu et al. | 375/257 |
| 2002/0191724 | A1 | * | 12/2002 | Bleisteiner et al. | 375/372 |
| 2007/0220367 | A1 | * | 9/2007 | Smith et al. | 714/48 |

(Continued)

FOREIGN PATENT DOCUMENTS

KR    WO 2013/151383 a1  * 10/2013  ........... H04N 21/236

OTHER PUBLICATIONS

Clifford E. Cummings et al., "Synchronous Resets? Asynchronous Resets? I am so confused! How will I ever know which to use?", SNUG, San Jose, 31 pages, 2002. http://www.sunburst-design.com/papers/CummingsSNUG2002SJ_Resets.pdf.

(Continued)

*Primary Examiner* — Jay P Patel
(74) *Attorney, Agent, or Firm* — Park, Vaughan, Fleming & Dowler LLP

(57) ABSTRACT

A circuit includes a plurality of synchronizers to adapt a signal from a first clock domain to a second clock domain. Each synchronizer of the plurality of synchronizers includes a synchronizer input to receive the signal from the first clock domain and a synchronizer output to provide the signal as adapted to the second clock domain. The circuit also includes a multiplexer (mux) that includes a plurality of mux inputs and a mux output. Each mux input is coupled to the synchronizer output of a respective synchronizer of the plurality of synchronizers. The mux output provides the signal, as adapted to the second clock domain, from the synchronizer output of a selected synchronizer of the plurality of synchronizers.

18 Claims, 7 Drawing Sheets

(56) References Cited

U.S. PATENT DOCUMENTS

| | | | | |
|---|---|---|---|---|
| 2007/0260939 | A1* | 11/2007 | Kammann et al. | 714/48 |
| 2008/0232527 | A1* | 9/2008 | Barkan | H04J 3/0685 375/362 |
| 2009/0129780 | A1* | 5/2009 | Bernasconi et al. | 398/79 |
| 2010/0242003 | A1* | 9/2010 | Kwok | 716/5 |
| 2012/0120256 | A1* | 5/2012 | Hwang et al. | 348/207.1 |
| 2013/0064115 | A1* | 3/2013 | Toyoda et al. | 370/252 |
| 2014/0015573 | A1* | 1/2014 | Ross | H03L 7/0812 327/142 |
| 2015/0081070 | A1* | 3/2015 | Hwang | 700/94 |

OTHER PUBLICATIONS

Neil H.E. Weste et al., "CMOS VLSI Design: A Circuits and Systems Perspective", Pearson Education, Inc., publishing as Addison-Wesley, Section 1.4.9 (pp. 16-19), Section 10.3 (pp. 391-402), Section 10.6 (411-420), 2011.

William J. Dally et al., "The Even/Odd Synchronizer: A Fast, All-Digital Periodic Synchronizer", 2010 IEEE Symposium on Asynchronous Circuits and Systems (ASYNC), pp. 75-84, May 2010.

Charles Dike et al., "Miller and Noise Effects in a Synchronizing Flip-Flop", IEEE Journal of Solid-State Circuits, vol. 34, No. 6, pp. 849-855, Jun. 1999.

Ran Ginosar, "Metastability and Synchronizers: A Tutorial", IEEE Design and Test of Computers, vol. 28, No. 5, pp. 23-35, Sep.-Oct. 2011.

Jun Zhou et al., "On-Chip Measurement of Deep Metastability in Synchronizers", IEEE Journal of Solid-State Circuits, vol. 43, No. 2, pp. 550-557, Feb. 2008.

Jennifer Stephenson et al., "Understanding Metastability in FPGAs", Altera, 6 pages, 2009. http://www.altera.com/literature/wp/wp-01082-quartus-ii-metastability.pdf.

Salomon Beer et al., "Metastability challenges for 65nm and beyond; Simulation and measurements", EDAA, 2013, 6 pages.

James Sebastian Guido et al., "Reconfigurable Controllers for Synchronization via Wagging", GLSVLSI'11, May 2-4, 2011, pp. 175-180, ACM.

Buckler, "Synchronizer Circuits with Failure-Condition Detection and Correction", U.S. Appl. No. 14/024,396, Sep. 11, 2013, 21 pages.

* cited by examiner

METHODS AND SYSTEMS OF SYNCHRONIZER SELECTION

STATEMENT OF GOVERNMENT INTEREST

This invention was made with Government support under Prime Contract Number DE-AC52-07NA27344, Subcontract Number B600716 awarded by DOE. The Government has certain rights in this invention.

TECHNICAL FIELD

The present embodiments relate generally to synchronizer circuits, and more specifically to selection of synchronizer circuits.

BACKGROUND

Synchronizers are circuits used to transition data between different clock domains in an electronic device. For example, a Multiple Clock Domain (MCD) device may use synchronizers to transition data between respective clock domains. An example of an MCD device is a Globally Asynchronous Locally Synchronous (GALS) System on a Chip (SoC), in which different parts of the chip operate at different frequencies, yet communicate with each other. Another example is a processor in which high-clock-rate processor cores communicate with slower cores and/or even slower memory. Still other examples are possible.

Different synchronizers have different power and performance characteristics. For example, a first synchronizer may have a shorter latency, and thus higher performance, than a second synchronizer, but at the cost of higher power consumption than the second synchronizer.

SUMMARY OF ONE OR MORE EMBODIMENTS

In some embodiments, a circuit includes a plurality of synchronizers to adapt a signal from a first clock domain to a second clock domain. Each synchronizer of the plurality of synchronizers includes a synchronizer input to receive the signal from the first clock domain and a synchronizer output to provide the signal as adapted to the second clock domain. The circuit also includes a multiplexer (mux) that includes a plurality of mux inputs and a mux output. Each mux input is coupled to the synchronizer output of a respective synchronizer of the plurality of synchronizers. The mux output provides the signal, as adapted to the second clock domain, from the synchronizer output of a selected synchronizer of the plurality of synchronizers.

In some embodiments, a method of synchronizing signals includes selecting one of a plurality of synchronizers in a circuit. In the selected synchronizer, a signal from a first clock domain in the circuit is adapted to a second clock domain in the circuit. Outputs of the plurality of synchronizers are multiplexed such that the signal from the selected synchronizer, as adapted to the second clock domain, is provided.

In some embodiments, a non-transitory computer-readable storage medium stores one or more programs configured for execution by a processor in a system that includes the processor and a plurality of synchronizers. The one or more programs include instructions to select a synchronizer of the plurality of synchronizers to adapt a signal from a first clock domain to a second clock domain.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1A:
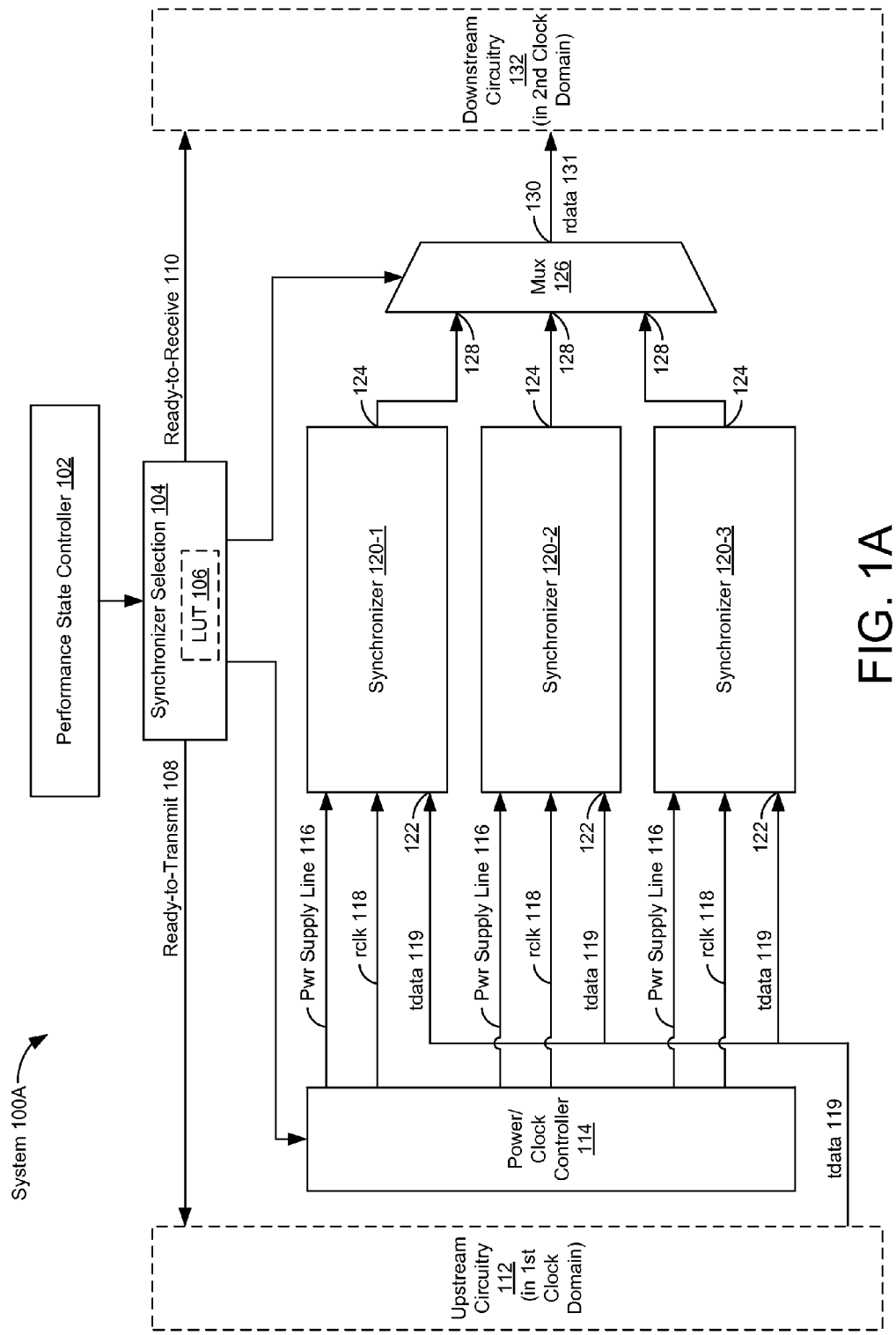
FIGS. 1A and 1B are block diagrams of a system in which a plurality of synchronizers is arranged in parallel between upstream circuitry in a first clock domain and downstream circuitry in a second clock domain, in accordance with some embodiments.

FIG. 1A is a block diagram of a system 100A in which a plurality of synchronizers 120, including synchronizers 120-1, 120-2, and 120-3, is arranged in parallel between upstream circuitry 112 in a first clock domain and downstream circuitry 132 in a second clock domain, in accordance with some embodiments. While FIG. 1A shows three synchronizers 120-1, 120-2, and 120-3 in parallel, the system 100A may alternatively include two synchronizers 120 in parallel or four or more synchronizers 120 in parallel. Each of the synchronizers 120-1, 120-2, and 120-3 includes an input 122 to receive transmit data (tdata) 119 from the upstream circuitry 112 in the first clock domain. The synchronizers 120-1, 120-2, and 120-3 are designed to adapt tdata 119 to the second clock domain, thereby providing receive data (rdata) 131. (Tdata 119 and rdata 131 thus correspond to the same signal as adapted to different clock domains.) Each of the synchronizers 120-1, 120-2, and 120-3 has a respective output 124 to provide rdata 131.

The outputs 124 of the synchronizers 120-1, 120-2, and 120-3 are coupled to respective inputs 128 of a multiplexer (mux) 126. The mux 126 selectively provides (and thus forwards) rdata 131 from one of the synchronizers 120-1, 120-2, and 120-3 through an output 130 to the downstream circuitry 132. To achieve this functionality, the mux 126 connects its output 130 to the input 128 that is coupled to a selected synchronizer 120 of the synchronizers 120-1, 120-2, and 120-3.

The system 100A includes a synchronizer selection module 104 that selects which of the synchronizers 120-1, 120-2, and 120-3 is to provide rdata 131. The synchronizer selection module 104 generates a control signal specifying the selected synchronizer 120 and provides this control signal to the mux 126. The mux 126 multiplexes the outputs 124 of the synchronizers 120-1, 120-2, and 120-3 based on the control signal: the input 128 coupled to the output 124 of the selected synchronizer 120 is connected to the output 130, thereby allowing rdata 131 to be forwarded from the selected synchronizer 120 to the downstream circuitry 132.

In some embodiments, the synchronizers 120-1, 120-2, and/or 120-3 that are not selected by the synchronizer selection module 104 (i.e., that are deselected) are power-gated and/or clock-gated. Power-gating and/or clock-gating the deselected synchronizers 120 places synchronizers 120 that are not currently being used in a low-power state, thus saving power. A power/clock controller 114 may perform this power-gating and/or clock-gating based on a control signal from the synchronizer selection module 104. Power supply lines 116, which are also referred to as power rails, are coupled between the power/clock controller 114 and the synchronizers 120-1, 120-2, and 120-3. The power/clock controller 114 provides power to the selected synchronizer 120 on its respective power supply line 116 but does not provide power to the deselected synchronizers 120 on their respective power supply lines 116. In this manner, the power/clock controller 114 power-gates the deselected synchronizers 120. Signal lines are coupled between the power/clock controller 114 and the synchronizers 120-1, 120-2, and 120-3 to convey a receive clock (rclk) 118. The power/clock controller 114 provides rclk 118 to the selected synchronizer 120 but not to the deselected synchronizers 120, thereby clock-gating the deselected synchronizers 120.

Rclk 118 is the clock for the second clock domain. The first clock domain corresponds to a separate transmit clock, which is not shown in FIG. 1A for simplicity. All or a portion of a respective synchronizer 120 may be part of the second clock domain, while a portion of a respective synchronizer 120 may be part of the first clock domain, depending on the synchronizer's design.

The synchronizer selection module 104 also generates a ready-to-transmit signal 108 and a ready-to-receive signal 110. The ready-to-transmit signal 108 is provided to the upstream circuitry 112 and the ready-to-receive signal 110 is provided to the downstream circuitry 132. The ready-to-transmit signal 108 enables transmission of tdata 119 by the upstream circuitry 112 when asserted and disables transmission of tdata 119 by the upstream circuitry 112 when de-asserted. The ready-to-receive signal 110 enables reception of rdata 131 by the downstream circuitry 132 when asserted and disables reception of rdata 131 by the downstream circuitry 132 when de-asserted. De-assertion of the ready-to-transmit signal 108 and ready-to-receive signal 110 accounts for a transition time when de-selecting a synchronizer 120 and selecting another synchronizer 120.

In some embodiments, the synchronizer selection module 104 selects one of the synchronizers 120-1, 120-2, and 120-3 based on a current performance state of the system 100A. A performance state controller 102 selects the current performance state from a plurality of available performance states. Each performance state corresponds, for example, to a respective combination of a power supply level (i.e., voltage) and a clock frequency. The performance states may be defined, for example, in accordance with the Advanced Configuration and Power Interface (ACPI) specification. The available performance states may be labeled $P_0, P_1, \ldots, P_n$, where n is a non-negative integer. The $P_0$ state has the highest supply voltage and/or clock frequency and thus the highest performance and highest power consumption of all the performance states. Successive performance states $P_1$ through $P_n$ have successively smaller supply voltages and/or clock frequencies, and thus have successively lower performance but also successively lower power consumption. The performance state controller 102 may dynamically change the current performance state during operation of the system 100A. Performance states may also be referred to as power-performance states.

The performance state controller 102 provides an indication of the current performance state to the synchronizer selection module 104. In some embodiments, the synchronizer selection module 104 includes a look-up table (LUT) 106 that is used to select a synchronizer 120 based on the performance state. The look-up table 106 maps respective performance states to respective ones of the synchronizers 120-1, 120-2, and 120-3. For example, a first performance state is mapped to the first synchronizer 120-1, a second performance state is mapped to the second synchronizer 120-2, and a third performance state is mapped to the third synchronizer 120-3.

The synchronizers 120-1, 120-2, and 120-3 have different power and performance characteristics. For example, the first synchronizer 120-1 may have a shorter latency and/or higher power consumption than the second synchronizer 120-2, which in turn may have a shorter latency and/or higher power consumption that the third synchronizer 120-3. Latency in this context refers to the delay associated with converting tdata 119 to rdata 131 (e.g., as measured in clock cycles). The first synchronizer 120-1 may be selected in a first performance state (e.g., $P_0$). The second synchronizer 120-2 may be selected in a second performance state (e.g., $P_1$) that has at least one of a lower power supply level and lower clock frequency than the first performance state. The third synchronizer 120-3 may be selected in a third performance state (e.g., $P_2$) that has at least one of a lower power supply level and lower clock frequency than the second performance state. Other examples are possible; for example, a given synchronizer 120 may be selected in multiple performance states. The selectability of synchronizers 120 in the system 100A thus allows performance to be traded off against power dynamically during operation, in accordance with performance states.

Figure 1B:
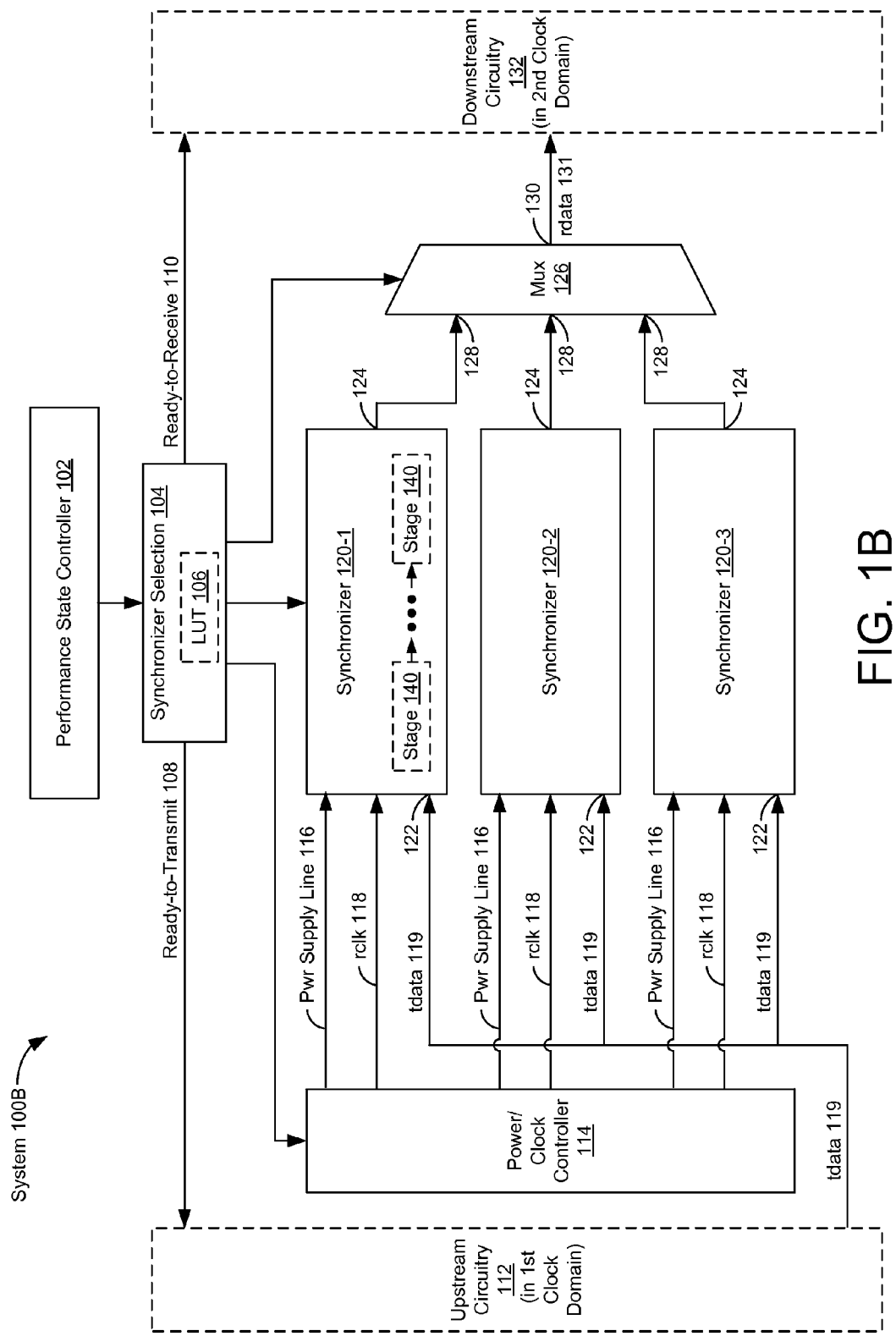

FIG. 1B is a block diagram of a system 100B, which is an example of the system 100A (FIG. 1A), in accordance with some embodiments. In the system 100B, the first synchronizer 120-1 includes a configurable number of stages 140 (e.g., such that one or more of the stages 140 may be bypassed in a configurable manner). The synchronizer selection module 104 specifies the number of stages 140 to be enabled in the first synchronizer 120-1 as part of selecting the first synchronizer 120-1. For example, the first synchronizer 120-1 may be selected with a first number of stages 140 enabled in a first performance state, may be selected with a second number of stages 140 enabled in a second performance state, and may be deselected in other performance states. The number of stages 140 to be enabled in a particular performance state may be specified in the look-up table 106. While FIG. 1B only shows the first synchronizer 120-1 as having a configurable number of stages 140, two or more (e.g., all) of the synchronizers 120 may have a configurable number of stages 140. Alternatively, none of the synchronizers 120 may have a configurable number of stages 140.

Figure 2:
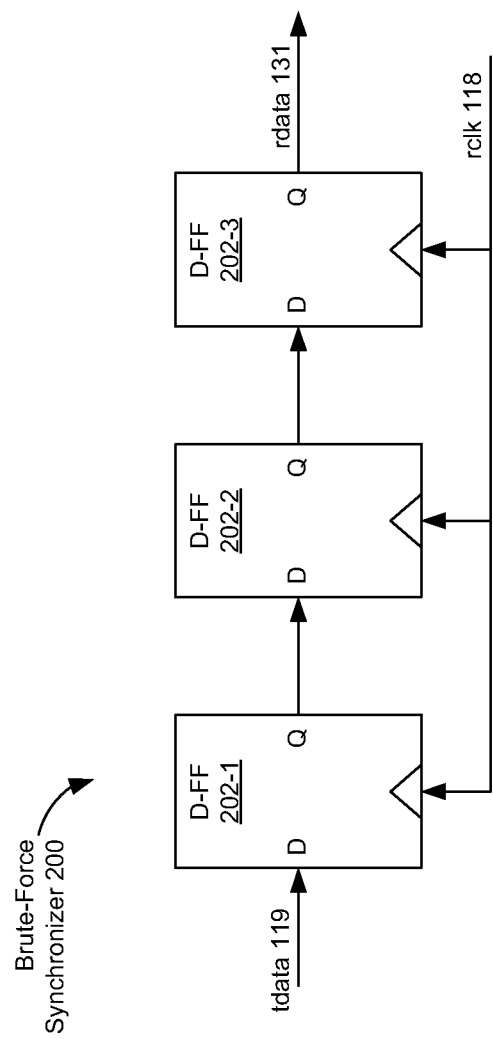
FIG. 2 is a circuit diagram of a brute-force synchronizer.

Attention is now directed to examples of synchronizers 120. FIG. 2 is a circuit diagram of a brute-force synchronizer 200. One of the synchronizers 120-1 through 120-3 may be implemented as the brute-force synchronizer 200. The brute-force synchronizer 200 includes three D flip-flops 202-1, 202-2, and 202-3 in series. Tdata 119 is provided to the input of the first D flip-flop 202-1. The output of the first D flip-flop 202-1 is provided to the input of the second D flip-flop 202-2, and the output of the second D flip-flop 202-2 is provided to the input of the third D flip-flop 202-3. The output of the third D flip-flop 202-3 provides rdata 131. The three D flip-flops 202-1, 202-2, and 202-3 are clocked by rclk 118.

Each of the three D flip-flops 202-1, 202-2, and 202-3 is a separate stage of the brute-force synchronizer 200. Because the brute-force synchronizer 200 has three D flip-flops 202-1, 202-2, and 202-3 in series, it is said to be three-deep. The latency of a brute-force synchronizer equals the depth: each of the D flip-flops 202-1, 202-2, and 202-3 adds a cycle of latency. Other brute-force synchronizers that may be used as one of the synchronizers 120-1 through 120-3 may be two deep or four deep or more. Furthermore, the number of stages may be configurable, as described with respect to FIG. 1B.

Figure 3:
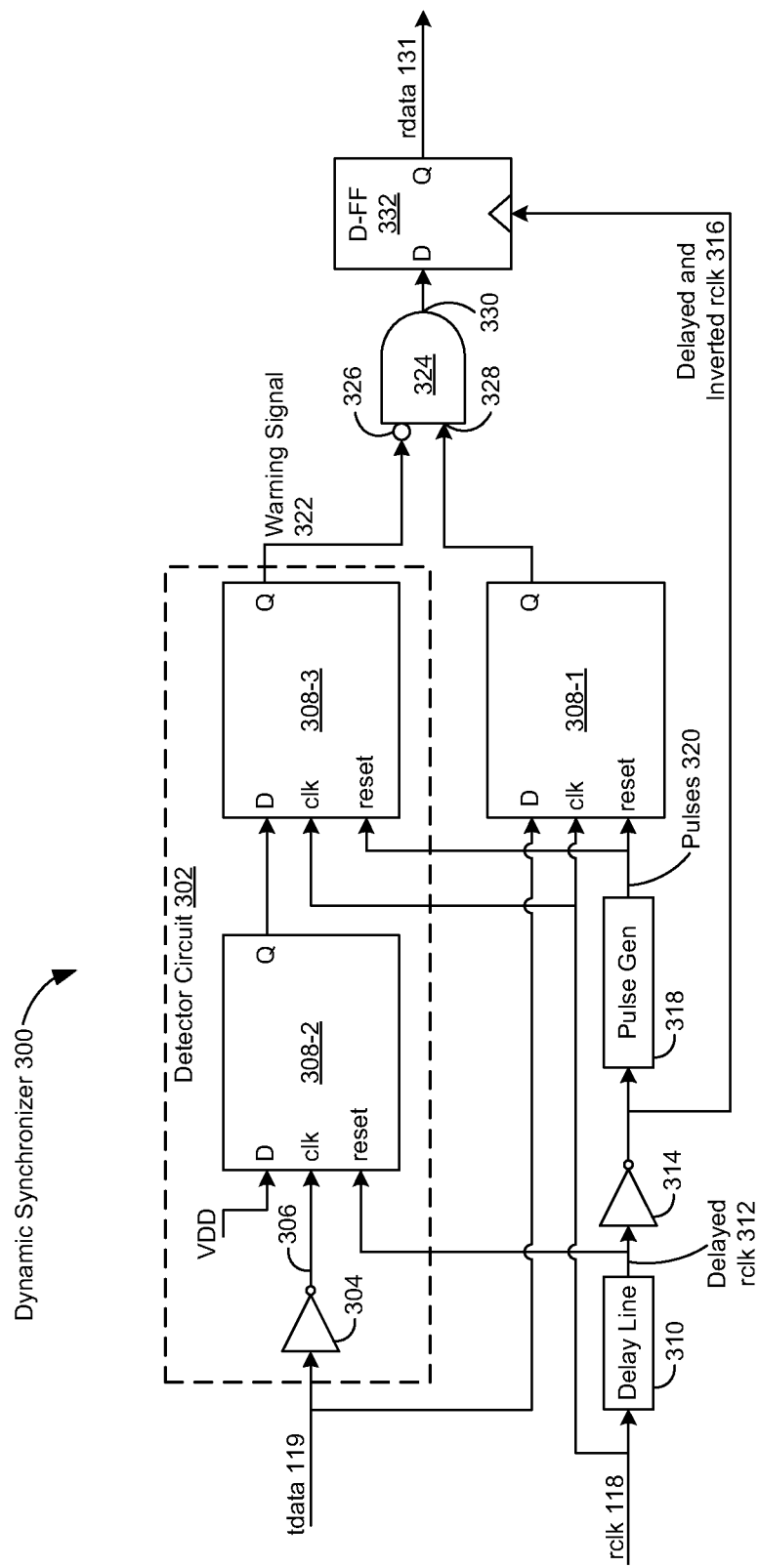
FIG. 3 is a circuit diagram of a dynamic synchronizer that includes resettable flip-flops.

FIG. 3 is a circuit diagram of a dynamic synchronizer 300 that includes resettable flip-flops 308-1, 308-2, and 308-3. One of the synchronizers 120-1 through 120-3 may be implemented as the dynamic synchronizer 300. As the term is used herein, a resettable flip-flop includes a data input, clock input, reset input, and data output. Resettable flip-flops thus are distinguishable from D flip-flops, which include data inputs, clock inputs, and data outputs, but do not include reset inputs. Also, a resettable flip-flop as the term is used herein is configured to provide an output signal from its data output that transitions from a first logic state to a second logic state in response to corresponding transitions of an input signal applied to its data input, but does not transition from the second logic state to the first logic state in response to corresponding transitions of the input signal. Instead, the output signal transitions from the second logic state to the first logic state in response to assertion of the reset signal. The resettable flip-flops 308-1, 308-2, and 308-3 in the dynamic synchronizer 300 are designed such that the first logic state is a logic-low state (e.g., '0') and the second logic state is a logic-high state (e.g., '1'). In other examples, however, the first logic state may be a logic-high state (e.g., '1') and the second logic state may be a logic-low state (e.g., '0').

The dynamic synchronizer 300 also includes a delay line 310, inverter 314, and pulse generator 318 arranged in series, such that the output of the pulse generator 318 is coupled to a reset input of the resettable flip-flop 308-1. The delay line 310 delays rclk 118, thereby producing a delayed rclk 312. The inverter 314 inverts the delayed rclk 312, thereby producing a delayed, inverted rclk 316. The pulse generator 318 generates pulses 320 based on the delayed, inverted rclk 316. The pulses 320 are provided to the reset input of the first resettable flip-flop 308-1 as a reset signal. The data input of the first resettable flip-flop 308-1 receives tdata 119 and the clock input of the first resettable flip-flop 308-1 receives rclk 118.

The dynamic synchronizer 300 further includes a detector circuit 302, AND gate 324, and D flip-flop 332. The detector circuit 302 detects '1' to '0' transitions (i.e., transitions from a logic-high state to a logic-low state, which are also referred to as high-to-low transitions) in tdata 119 and asserts a warning signal 322 in response to the detected '1' to '0' transitions. The warning signal 322 is provided to an inverting first input 326 of the AND gate 324. (Alternatively, an inverter coupled between the third resettable flip-flop 308-3 and the AND gate 324 inverts the warning signal 322 and provides the inverted warning signal to the AND gate 324. This inverter may be considered part of the detector circuit 302 or a separate component of the dynamic synchronizer 300.) An output signal from the data output of the first resettable flip-flop 308-1 is provided to a non-inverting second input 328 of the AND gate 324. An output 330 of the AND gate 324 is coupled to a data input of the D flip-flop 332, which receives the delayed, inverted rclk 316 at its clock input. The data output of the D flip-flop 332 provides rdata 131.

Assertion of the warning signal 322 forces the output 330 of the AND gate 324 low, which in turn forces rdata 131 to a logic-low state. Since the warning signal 322 is asserted in response to '1' to '0' transitions, rdata 131 is forced low in response to '1' to '0' transitions, in a manner that avoids an extended latency associated with '1' to '0' transitions that would occur in the absence of the detector circuit 302 and the AND gate 324. When the warning signal 322 is de-asserted, the AND gate 324 passes the output signal from the data output of the first resettable flip-flop 308-1 through to the data input of the D flip-flop 332.

The detector circuit 302 includes an inverter 304, the second resettable flip-flop 308-2, and the third resettable flip-flop 308-3. The inverter 304 receives tdata 119 and provides inverted tdata 306. The second resettable flip-flop 308-2 has a data input connected to a power supply (VDD), a clock input that receives the inverted tdata 306, and a reset input that receives the delayed rclk 312. Connecting the data input of the second resettable flip-flop 308-2 to VDD effectively provides a signal fixed in a logic-high state to the data input. The third resettable flip-flop 308-3 has a data input coupled to the data output of the second resettable flip-flop 308-2, a clock input that receives rclk 118, and a reset input that receives the pulses 320. The data output of the third resettable flip-flop 308-3 provides the warning signal 322.

In operation, applying the delayed rclk 312 to the reset input of the second resettable flip-flop 308-2 ensures that the data output of the second resettable flip-flop 308-2, and thus also the data output of the third resettable flip-flop 308-3, provides a '0' unless a '1' to '0' transition occurs for tdata 119. A '1' to '0' transition for tdata 119 results in a rising edge on the inverted tdata 306, which causes the second resettable flip-flop 308-2 to sample the '1' provided by VDD. The output signal provided by the data output of the second resettable flip-flop 308-2 transitions from '0' to '1' accordingly, which in turn causes the third resettable flip-flop 308-3 to transition the warning signal 322 from '0' to '1', thereby asserting the warning signal 322. (While the warning signal 322 is considered to be asserted when high in this example, in some embodiments a detector circuit 302 may be designed such that the warning signal 322 is considered to be asserted when low.)

In some embodiments, the inverter 304 is omitted, resulting in a detector circuit that asserts a warning signal in response to low-to-high transitions instead of high-to-low transitions. Such a detector circuit could be used in a dynamic synchronizer in which the first resettable flip-flop 308-1 is replaced with a resettable flip-flop for which the first logic state is a logic-high state and the second logic state is a logic-low state.

In some embodiments, a synchronizer that includes the circuitry of FIG. 3 may also include additional stages, with the number of additional stages being configurable (e.g., as described for the stages 140, FIG. 1B). For example, each additional stage may include a resettable flip-flop in series with a D flip-flop.

Figure 4:
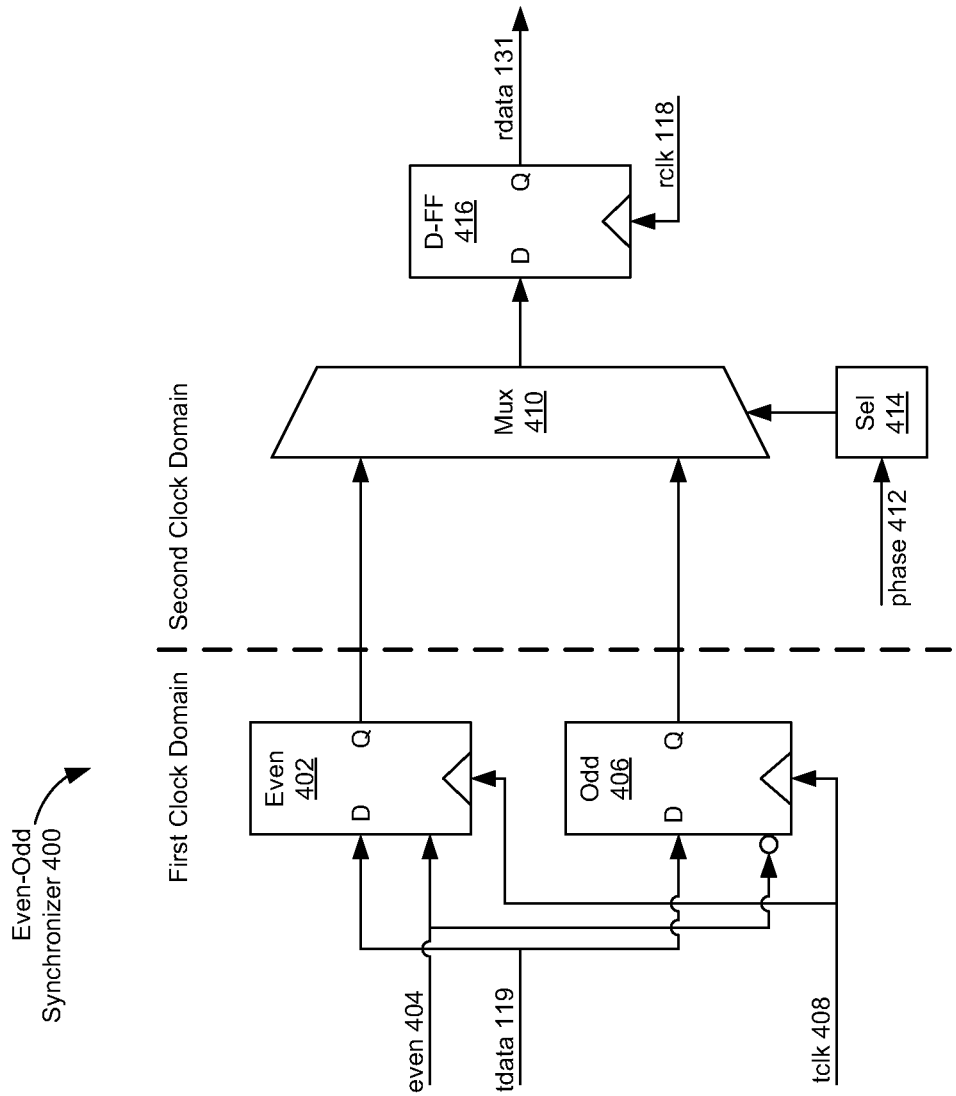
FIG. 4 is a circuit diagram of an even/odd synchronizer.

FIG. 4 is a circuit diagram of an even/odd synchronizer 400. One of the synchronizers 120-1 through 120-3 may be implemented as the even/odd synchronizer 400 in accordance with some embodiments. The even/odd synchronizer 400 samples bit values of tdata 119 in two different flip-flops in an alternating manner: for even clock cycles, tdata 119 is sampled into an even flip-flop 402; for odd clock cycles, tdata 119 is sampled into an odd flip-flop 406. An "even" signal 404 indicates whether a cycle is even or odd. The even flip-flop 402 and odd flip-flop 404 are clocked by a transmit clock (tclk) 408 and thus may be considered part of the first clock domain. The outputs of the even flip-flop 402 and odd flip-flop 404 are multiplexed by a mux 410 based on a control signal provided by a selection module ("Sel") 414. The selection module 414 generates the control signal based on a predicted phase of tclk 408 at the end of a current cycle of rclk 118, as is known in the art. The mux 410 provides its output to a D flip-flop 416, which is clocked by rclk 118 and provides rdata 131 as output. The D flip-flop 416 thus samples the most recently written one of the even flip-flop 402 and odd flip-flop 406 that is considered safe to sample, as determined based on the predicted phase of tclk 408. The mux 410, selection module 414, and D flip-flop 416 are part of the second clock domain.

The even/odd synchronizer 400 may have an average latency of a fraction of a cycle, which is superior to the brute-force synchronizer 200 (FIG. 2) and/or dynamic synchronizer 300 (FIG. 3). However, the even/odd synchronizer 400 may have higher power consumption than the brute-force synchronizer 200 and/or dynamic synchronizer 300. In some embodiments, the system 100A (FIG. 1A) (e.g., the system 100B, FIG. 1B) includes the even/odd synchronizer 400 as the first synchronizer 120-1, the dynamic synchronizer 300 as the second synchronizer 120-2, and the brute-force synchronizer 200 as the third synchronizer 120-3. The even/odd synchronizer 400 is selected in a first performance state (e.g., $P_0$). The dynamic synchronizer 300 is selected in a second performance state (e.g., $P_1$) that has at least one of a lower voltage and lower clock frequency that the first performance state. The brute-force synchronizer 200 is selected in a third performance state (e.g., $P_2$) that has at least one of a lower voltage and lower clock frequency that the second performance state.

The brute-force synchronizer 200, dynamic synchronizer 300, and even/odd synchronizer 400 are merely examples of synchronizers that may be used as respective ones of the synchronizers 120-1, 120-2, and 120-3. Other examples are possible. For example, ones of the synchronizers 120-1, 120-2, and 120-3 may be a wagging synchronizer.

Figure 5:
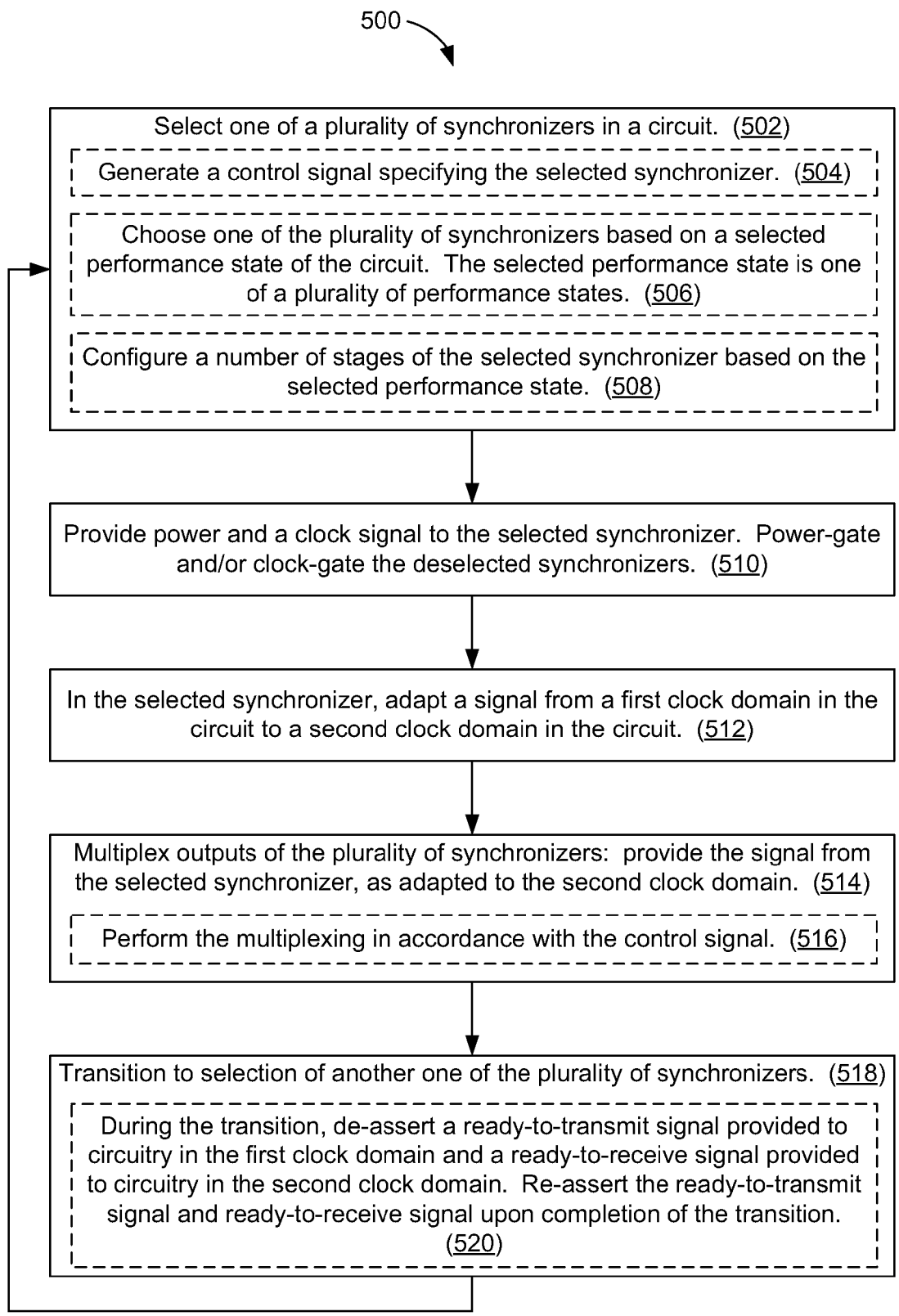
FIG. 5 is a flowchart of a method of synchronizing signals in accordance with some embodiments.

FIG. 5 is a flowchart of a method 500 of synchronizing signals in accordance with some embodiments. The method 500 is performed, for example, in the system 100A (FIG. 1A), an example of which is the system 100B (FIG. 1B).

In the method 500, one of a plurality of synchronizers 120 (e.g., synchronizers 120-1 through 120-3) in a circuit is selected (502). The other synchronizers 120 of the plurality of synchronizers 120 are deselected. In some embodiments, a control signal is generated (504) specifying the selected synchronizer 120. For example, the synchronizer selection module 104 generates the control signal.

In some embodiments, one of the plurality of synchronizers 120 is chosen (506) based on a selected performance state of the circuit (e.g., the current performance state as specified by the performance state controller 102). The selected performance state is one of a plurality of performance states.

In some embodiments, a number of stages 140 (FIG. 1B) of the selected synchronizer 120 is configured (508) based on the selected performance state. For example, the synchronizer selection module 104 specifies the number of stages 140 to be enabled in the selected synchronizer 120, based on the selected performance state.

In some embodiments, power and a clock signal are provided (510) to the selected synchronizer 120 (e.g., by the power/clock controller 114). The deselected synchronizers 120 are power-gated and/or clock-gated (510) (e.g., by the power/clock controller 114).

In the selected synchronizer 120, a signal (e.g., tdata 119) from a first clock domain in the circuit is adapted (512) to a second clock domain in the circuit (e.g., resulting in rdata 131).

Outputs of the plurality of synchronizers 120 are multiplexed (514), such that the signal from the selected synchronizer 120, as adapted to the second clock domain, is provided (e.g., forwarded to the downstream circuitry 132). In some embodiments, the mux 126 performs (516) this multiplexing in accordance with the control signal generated in operation 504.

A transition may occur (518) to selection of another one of the plurality of synchronizers 120, such that the selected synchronizer 120 changes from a first synchronizer 120 of the plurality of synchronizers 120 to a second synchronizer 120 of the plurality of synchronizers 120 (e.g., in response to a change in performance state). During the transition, a ready-to-transmit signal 108 provided to upstream circuitry 112 in the first clock domain and a ready-to-receive signal 110 provided to downstream circuitry 132 in the second clock domain are de-asserted (520). The ready-to-transmit signal 108 and ready-to-receive signal 110 are re-asserted upon completion of the transition, thereby indicating that transmission of data from the first clock domain to the second clock domain may resume. The method 500 then repeats for the newly selected synchronizer 120.

While the method 500 includes a number of operations that appear to occur in a specific order, it should be apparent that the method 700 can include more or fewer operations, some of which can be executed serially or in parallel. An order of two or more operations may be changed, performance of two or more operations may overlap, and two or more operations may be combined into a single operation.

In some embodiments, the synchronizer selection module 104 is implemented in hardware. Alternatively, the synchronizer selection module 104 is implemented in software (e.g., firmware).

Figure 6:
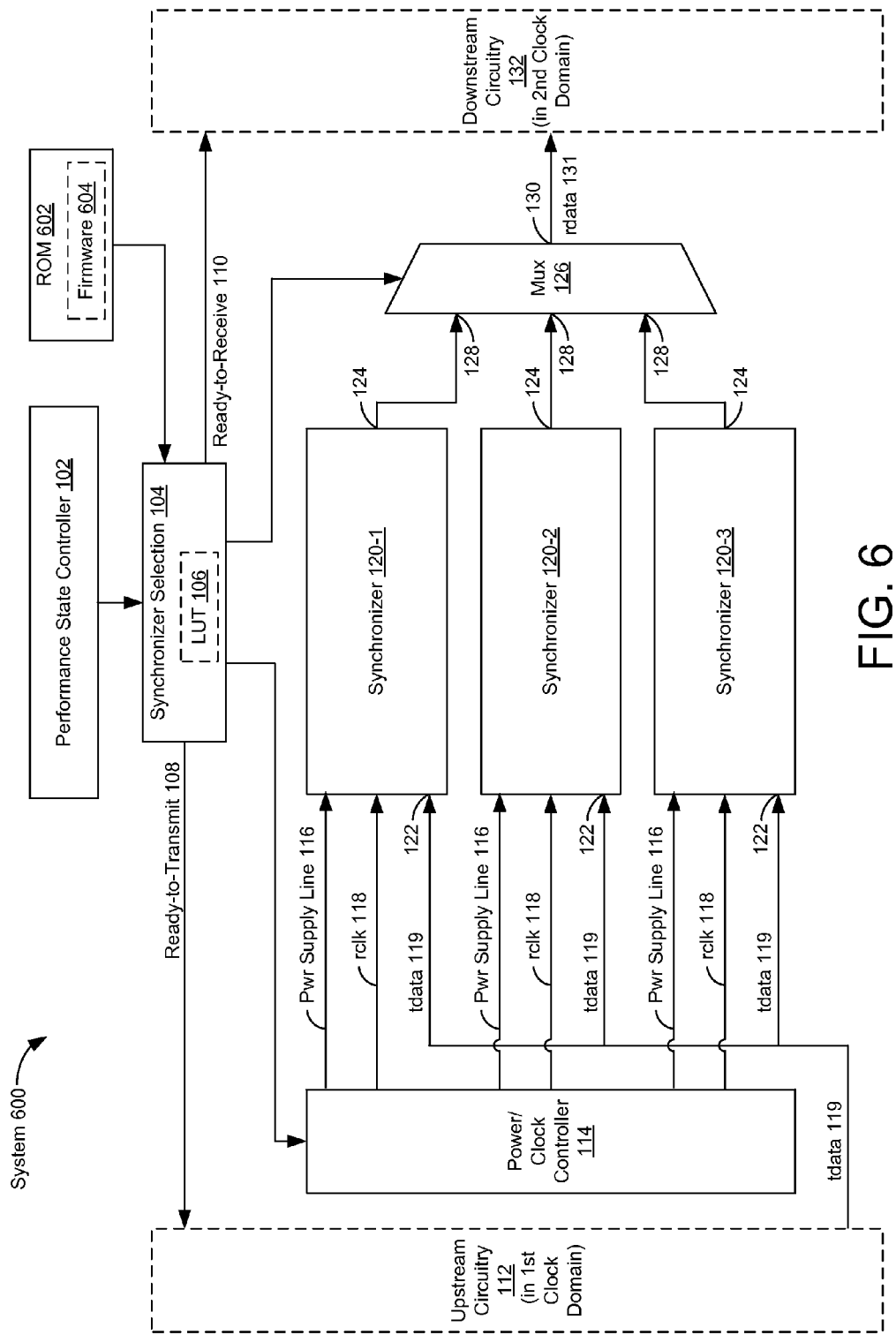
FIG. 6 is a block diagram of a system in which the functionality of a synchronizer selection module is implemented in firmware in accordance with some embodiments.

FIG. 6 is a block diagram of a system 600 in which the synchronizer selection module 104 is implemented in firmware in accordance with some embodiments. The system 600 is an example of the system 100A/100B (FIGS. 1A-1B). In the system 600, the synchronizer selection module 104 may be or include a processor. A read-only memory (ROM) 602 (e.g., a BIOS ROM) stores firmware 604 on a non-transitory computer-readable storage medium. The firmware 604 includes one or more programs with instructions configured for execution by the processor of the synchronizer selection module 104. While the firmware 604 is shown in FIG. 6 as being stored in the ROM 602, it may alternately be stored in a non-transitory computer-readable storage medium of a different non-volatile memory (e.g., a Flash memory, hard-disk drive, etc.) coupled to the synchronizer selection module 104. The instructions of the firmware 604, when executed by the processor of the synchronizer selection module 104, cause the synchronizer selection module 104 to function as described herein. For example, the firmware 604 includes instructions to perform at least a portion of the method 500 (FIG. 5) (e.g., to perform operations 502, 504, 506, 508, 510, 518, and/or 520, FIG. 5).

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A circuit, comprising:
   a plurality of synchronizers to adapt a signal from a first clock domain to a second clock domain, wherein each synchronizer of the plurality of synchronizers comprises a synchronizer input to receive the signal from the first clock domain and a synchronizer output to provide the signal as adapted to the second clock domain;
   a multiplexer (mux) comprising a plurality of mux inputs and a mux output, wherein each mux input is coupled to the synchronizer output of a respective synchronizer of the plurality of synchronizers and the mux output is to provide the signal, as adapted to the second clock domain, from the synchronizer output of a selected synchronizer of the plurality of synchronizers; and
   a synchronizer selection module to select one of the plurality of synchronizers as the selected synchronizer and to provide a control signal specifying the selected synchronizer to the mux, wherein the mux is to connect the mux output to the mux input coupled to the synchronizer output of the selected synchronizer in response to the control signal.

2. The circuit of claim 1, further comprising a state controller to select a performance state from a plurality of performance states;
   wherein the synchronizer selection module is to select one of the plurality of synchronizers as the selected synchronizer based on the selected performance state.

3. The circuit of claim 2, wherein:
   the plurality of synchronizers comprises a first synchronizer and a second synchronizer, the second synchronizer having a lower power consumption than the first synchronizer;
   the plurality of performance states comprises a first performance state and a second performance state, the second performance state having at least one of a lower power supply level and a lower clock frequency than the first performance state; and
   the synchronizer selection module is to select the first synchronizer in response to selection of the first performance state by the state controller and select the second synchronizer in response to selection of the second performance state by the state controller.

4. The circuit of claim 2, wherein:
   the plurality of synchronizers comprises a first synchronizer and a second synchronizer, the first synchronizer having a lower latency that the second synchronizer;
   the plurality of performance states comprises a first performance state and a second performance state, the second performance state having at least one of a lower power supply level and a lower clock frequency than the first performance state; and
   the synchronizer selection module is to select the first synchronizer in response to selection of the first performance state by the state controller and select the second synchronizer in response to selection of the second performance state by the state controller.

5. The circuit of claim 1, further comprising a control module, coupled to the synchronizer selection module, to provide power to the selected synchronizer and to power-gate deselected synchronizers of the plurality of synchronizers.

6. The circuit of claim 1, further comprising a control module, coupled to the synchronizer selection module, to provide a clock signal to the selected synchronizer and to clock-gate deselected synchronizers of the plurality of synchronizers.

7. The circuit of claim 1, further comprising a control module, coupled to the synchronizer selection module, to:
   provide power and a clock signal to the selected synchronizer; and
   power-gate and clock-gate deselected synchronizers of the plurality of synchronizers.

8. The circuit of claim 1, wherein:
   the synchronizer selection module is to provide a ready-to-transmit signal to circuitry in the first clock domain and a ready-to-receive signal to circuitry in the second clock domain;
   the synchronizer selection module is to assert the ready-to-transmit signal and the ready-to-receive signal while one of the plurality of synchronizers is selected as the selected synchronizer; and
   the synchronizer selection module is to de-assert the ready-to-transmit signal and the ready-to-receive signal while transitioning between selection of different synchronizers of the plurality of synchronizers.

9. The circuit of claim 1, wherein:
   a respective synchronizer of the plurality of synchronizers comprises a configurable number of stages; and
   the synchronizer selection module is to specify the number of stages for the respective synchronizer when the respective synchronizer is selected as the selected synchronizer.

10. A method of synchronizing signals, comprising:
    selecting one of a plurality of synchronizers in a circuit, the selecting comprising choosing one of the plurality of synchronizers based on a selected performance state of the circuit, wherein the selected performance state is one of a plurality of performance states;
    in the selected synchronizer, adapting a signal from a first clock domain in the circuit to a second clock domain in the circuit; and
    multiplexing outputs of the plurality of synchronizers, the multiplexing comprising providing the signal from the selected synchronizer, as adapted to the second clock domain.

11. The method of claim 10, wherein:
    the selecting further comprises generating a control signal specifying the selected synchronizer; and
    the multiplexing is performed in accordance with the control signal.

12. The method of claim 10, wherein:
    the plurality of synchronizers comprises a first synchronizer and a second synchronizer, the second synchronizer having a lower power consumption than the first synchronizer;
    the plurality of performance states comprises a first performance state and a second performance state, the second performance state having at least one of a lower power supply level and a lower clock frequency than the first performance state; and
    the choosing comprises choosing the first synchronizer when the selected performance state is the first performance state and choosing the second synchronizer when the selected performance state is the second performance state.

13. The method of claim 10, wherein:
    the plurality of synchronizers comprises a first synchronizer and a second synchronizer, the first synchronizer having a lower latency that the second synchronizer;
    the plurality of performance states comprises a first performance state and a second performance state, the second performance state having at least one of a lower power supply level and a lower clock frequency than the first performance state; and the choosing comprises choosing the first synchronizer when the selected performance state is the first performance state and choosing the second synchronizer when the selected performance state is the second performance state.

14. The method of claim 10, wherein each synchronizer of the plurality of synchronizers except the selected synchronizer is deselected, the method further comprising:

providing power to the selected synchronizer; and power-gating the deselected synchronizers of the plurality of synchronizers.

15. The method of claim 10, wherein each synchronizer of the plurality of synchronizers except the selected synchronizer is deselected, the method further comprising:

providing a clock signal to the selected synchronizer; and clock-gating the deselected synchronizers of the plurality of synchronizers.

16. The method of claim 10, further comprising:

providing a ready-to-transmit signal to circuitry in the first clock domain;

asserting the ready-to-transmit signal while a first synchronizer of the plurality of synchronizers is the selected synchronizer;

transitioning from selection of the first synchronizer to selection of a second synchronizer of the plurality of synchronizers as the selected synchronizer;

during the transitioning, de-asserting the ready-to-transmit signal; and after the transitioning, re-asserting the ready-to-transmit signal.

17. The method of claim 16, further comprising:

providing a ready-to-receive signal to circuitry in the second clock domain;

asserting the ready-to-receive signal while the first synchronizer is the selected synchronizer;

during the transitioning, de-asserting the ready-to-receive signal; and after the transitioning, re-asserting the ready-to-receive signal.

18. A non-transitory computer-readable storage medium storing one or more programs configured for execution by a processor in a system that comprises the processor and a plurality of synchronizers, the one or more programs comprising:

instructions to select a synchronizer of the plurality of synchronizers to adapt a signal from a first clock domain to a second clock domain, the selecting comprising choosing one of the plurality of synchronizers based on a selected performance state of the circuit, wherein the selected performance state is one of a plurality of performance states; and instructions to cause a multiplexer (mux) comprising a plurality of mux inputs and a mux output, wherein each mux input is coupled to a synchronizer output of a respective synchronizer of the plurality of synchronizers, to provide a signal, via the mux output, from the synchronizer output of the selected synchronizer.

* * * * *